(12) United States Patent
Hong et al.

(10) Patent No.: US 11,247,592 B2
(45) Date of Patent: Feb. 15, 2022

(54) CENTER HINGE ASSEMBLY FOR VEHICLE REAR SEAT

(71) Applicants: HYUNDAI MOTOR COMPANY, Seoul (KR); KIA MOTORS CORPORATION, Seoul (KR)

(72) Inventors: Suk Won Hong, Bucheon-si (KR); Sang Do Park, Suwon-si (KR); Jong Seok Han, Seoul (KR); Sung Hak Hong, Suwon-si (KR); Sang Man Seo, Suwon-si (KR); Chan Ho Jung, Gunpo-si (KR); Ju Yeol Kong, Ansan-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 0 days.

(21) Appl. No.: 16/904,971

(22) Filed: Jun. 18, 2020

(65) Prior Publication Data
US 2021/0162902 A1 Jun. 3, 2021

(30) Foreign Application Priority Data
Dec. 2, 2019 (KR) .................. 10-2019-0157910

(51) Int. Cl.
*B60N 2/68* (2006.01)
*B60N 2/30* (2006.01)
*B60N 2/22* (2006.01)

(52) U.S. Cl.
CPC .............. *B60N 2/682* (2013.01); *B60N 2/22* (2013.01); *B60N 2/3013* (2013.01); *B60N 2002/684* (2013.01); *B60N 2205/35* (2013.01)

(58) Field of Classification Search
CPC ............................. B60N 2/682; B60N 2/3013
(Continued)

(56) References Cited

U.S. PATENT DOCUMENTS 507,403 A * 10/1893 Bell ..................... F16B 7/182
403/215
1,261,213 A * 4/1918 Clay ..................... F16B 2/065
403/233
(Continued)

FOREIGN PATENT DOCUMENTS

CN 205800842 U * 12/2016 ............... B60N 2/20
DE 19926093 C1 * 8/2000 ............ B60N 2/3013
(Continued)

*Primary Examiner* — Timothy J Brindley
(74) *Attorney, Agent, or Firm* — McDonnell Boehnen Hulbert & Berghoff LLP

(57) ABSTRACT

The present disclosure provides a center hinge assembly for a vehicle rear seat, which includes a lower bracket having a first seating groove formed at one end thereof so that a first shaft or a second shaft is inserted into the first seating groove, and a first locking groove formed at the other end thereof, deeper than the first seating groove, so that a bush fastened to the first or second shaft is inserted and locked into the first locking groove, and an upper bracket having a second seating groove formed at one end thereof so that the first or second shaft is inserted into the second seating groove, and a second locking groove formed at the other end thereof, deeper than the second seating groove, so that the bush is inserted and locked into the second locking groove.

16 Claims, 13 Drawing Sheets

(58) Field of Classification Search
USPC .................. 297/248; 403/331, 178, 173, 174
See application file for complete search history.

(56) References Cited

U.S. PATENT DOCUMENTS

| | | | | |
|---|---|---|---|---|
| 2,038,379 | A * | 4/1936 | Ostdiek | A47L 13/24 15/147.2 |
| 2,466,148 | A * | 4/1949 | Birr | A47C 7/004 248/188.7 |
| 3,381,986 | A * | 5/1968 | Seelig | F16C 11/12 403/220 |
| 4,066,373 | A * | 1/1978 | Workman | A47C 1/124 24/339 |
| 8,020,932 | B2 * | 9/2011 | Yamada | B60N 2/682 297/257 |

FOREIGN PATENT DOCUMENTS

| | | | | | |
|---|---|---|---|---|---|
| KR | 20140093370 | A * | 7/2014 | ............ | B60N 2/686 |
| KR | 101518627 | B1 * | 5/2015 | | |
| KR | 101518642 | B1 * | 5/2015 | ............ | B60N 2/686 |
| WO | WO-2008119538 | A1 * | 10/2008 | ............ | B60N 2/502 |
| WO | WO-2016167288 | A1 * | 10/2016 | ............ | A47C 7/543 |

* cited by examiner

CENTER HINGE ASSEMBLY FOR VEHICLE REAR SEAT

CROSS REFERENCE TO RELATED APPLICATIONS

This application claims under 35 U.S.C. § 119(a) the benefit of priority to Korean Patent Application No. 10-2019-0157910 filed on Dec. 2, 2019, the entire contents of which are incorporated herein by reference.

BACKGROUND (a) Technical Field

The present disclosure relates to a center hinge assembly for a vehicle rear seat. More particularly, it relates to a center hinge assembly for a vehicle rear seat, which has a newly improved structure capable of achieving a reduction in the number of parts, a reduction in man-hours of work, etc., wherein the center hinge assembly connects left and right seat frames of a rear seat.

(b) Background Art

A vehicle rear seat is installed in various forms of arrangement, for example, in a form in which three seats, such as a center seat and left and right seats, are arranged side by side adjacent to each other, or in a form in which two seats, such as left and right seats, are arranged side by side adjacent to each other, or otherwise in a form in which left and right seats are arranged independently.

In particular, a center hinge assembly is disposed between the constituent left and right seats of the rear seat for the folding operation of the left or right seat (e.g., rotation of a seat back in close contact with a seat cushion).

Hereinafter, the configuration and assembly structure of a conventional center hinge assembly will be described as follows.

FIGS. 1 to 3 are perspective views illustrating an assembly structure of a conventional center hinge assembly, wherein reference numeral 100 designates a center hinge assembly.

The center hinge assembly 100 rotatably connects a left seat frame 210 and a right seat frame 220 of a rear seat, and includes a lower fixing bracket 110, which includes a first support bracket 111 and a second support bracket 112 closely coupled to each other so that they are fixedly mounted on a floor panel, and an upper cover bracket 120 hinged to the upper end of the lower fixing bracket 110 so as to be openable and closable.

The upper ends of the first and second support brackets 111 and 112 are formed with bolt fastening ends 113 horizontally overlapping each other, and pipe seating grooves 114 are formed immediately behind the bolt fastening ends 113.

In this case, a first shaft 212 extending from the left seat frame 210 and a second shaft 222 extending from the right seat frame 220 are inserted and seated into the pipe seating grooves 114.

Substantially, a first bush 214 mounted to the first shaft 212 and a second bush 224 mounted to the second shaft 222 are inserted and seated into the pipe seating grooves 114.

The upper cover bracket 120 has an inverted "U"-shaped cover structure, and the rear end thereof is hinged to the rear of the upper end of the lower fixing bracket 110 via a hinge pin 122 so that the upper cover bracket 120 is openable and closable. In addition, the upper cover bracket 120 has a bolt fastening hole 124 formed through the upper plate thereof, the bolt fastening hole 124 matching the bolt fastening ends 113.

In order to foldably assemble the left and right seat frames 210 and 220 to the conventional center hinge assembly 100, the lower fixing bracket 110 is first mounted on the floor panel.

After the rear seat is then put into the interior of the vehicle, the first bush 214 of the first shaft 212 extending from the left seat frame 210 and the second bush 224 of the second shaft 222 extending from the right seat frame 220 are inserted and seated into the pipe seating grooves 114 with the upper cover bracket 120 opened.

When the upper cover bracket 120 is then rotated to the closed position, the bolt 130 is inserted and fastened into the bolt fastening hole 126 of the upper cover bracket 120 and the bolt fastening ends 113 of the lower fixing bracket 110, resulting in completion of assembly of the rear seat to the center hinge assembly.

However, the conventional center hinge assembly as described above has the following disadvantages.

First, the conventional center hinge assembly causes an increase in cost due to a large number of parts and a decrease in assembly workability due to considerable man-hours of work by the operator.

Second, since the conventional center hinge assembly is made of steel and is heavy, it runs counter to the reduction in weight.

Third, the operator continues to repeat operations, such as bolt fastening and nut fastening, using a separate tool to lock the upper cover bracket in the assembly line of the rear seat frame to the center hinge assembly, resulting in a decrease in assembly workability and thus a defect in assembly quality.

The above information disclosed in this Background section is only for enhancement of understanding of the background of the disclosure and therefore it may contain information that does not form the prior art that is already known in this country to a person of ordinary skill in the art.

SUMMARY

The present disclosure has been made in an effort to solve the above-described problems associated with the prior art.

In an aspect, the present disclosure provides a center hinge assembly for a vehicle rear seat, which has a newly improved structure with a reduction in the number of parts, a reduction in man-hours of work, etc., and the center hinge assembly connects left and right seat frames of a rear seat.

In an embodiment, there is provided a center hinge assembly for a vehicle rear seat, which includes a lower bracket having a first seating groove formed at one end thereof, so that a first shaft of a left seat frame or a second shaft of a right seat frame is inserted into the first seating groove, and a first locking groove formed at the other end thereof, deeper than the first seating groove, so that a bush fastened to the first or second shaft is inserted and locked into the first locking groove, and an upper bracket having a second seating groove formed at one end thereof, so that the first shaft of the left seat frame or the second shaft of the right seat frame is inserted into the second seating groove, and a second locking groove formed at the other end thereof, deeper than the second seating groove, so that the bush fastened to the first or second shaft is inserted and locked into the second locking groove.

The first and second seating grooves may each be formed as a semi-circular groove, and may form a circular groove while surrounding the first or second shaft when the lower and upper brackets are closely coupled to each other.

The first and second locking grooves may each be formed as a semi-circular groove, and may form a circular groove while surrounding the bush when the lower and upper brackets are closely coupled to each other.

The one ends of the lower and upper brackets may be fixed to the first or second shaft by welding.

The bush may include a first semi-circular bush, inserted and locked into the first locking groove of the lower bracket, and a second semi-circular bush inserted and locked into the second locking groove of the upper bracket.

The first and second bushes may have anti-decoupling ends protruding from outer surfaces of respective tips thereof so that the anti-decoupling ends are inserted and locked into the first locking groove of the lower bracket and the second locking groove of the upper bracket.

The first and second bushes may have restraint grooves formed on inner surfaces of respective tips thereof so that an anti-decoupling flange formed at the end of the first or second shaft is inserted and locked into the restraint grooves.

A first bolt fastening hole may be formed between the one end and the other end of the lower bracket, and a second bolt fastening hole may be formed between the one end and the other end of the upper bracket.

In another embodiment, there is provided a center hinge assembly for a vehicle rear seat, which includes a lower bracket having a first seating groove formed at one end thereof, so that a first shaft of a left seat frame or a second shaft of a right seat frame is inserted into the first seating groove, a first support groove formed at the other end thereof, so that a bush fastened to the first or second shaft is seated in the first support groove, and a first common locking groove formed between the one end and the other end thereof, deeper than the first seating groove and the first support groove, so that an anti-decoupling flange of the first or second shaft is inserted and locked into the first common locking groove while the bush is inserted and locked into the first common locking groove, and an upper bracket having a second seating groove formed at one end thereof, so that the first shaft of the left seat frame or the second shaft of the right seat frame is inserted into the second seating groove, a second support groove formed at the other end thereof, so that the bush fastened to the first or second shaft is seated in the second support groove, and a second common locking groove formed between the one end and the other end thereof, deeper than the second seating groove and the second support groove, so that the anti-decoupling flange of the first or second shaft is inserted and locked into the second common locking groove while the bush is inserted and locked into the second common locking groove.

The first and second seating grooves may each be formed as a semi-circular groove, and may form a circular groove while surrounding the first or second shaft when the lower and upper brackets are closely coupled to each other.

The first and second support grooves may each be formed as a semi-circular groove, and may form a circular groove while surrounding the bush when the lower and upper brackets are closely coupled to each other.

The first and second common locking grooves may each be formed a semi-circular groove, and may form a circular groove while locking the first or second shaft and the bush when the lower and upper brackets are closely coupled to each other.

The bush may include a first semi-circular bush, seated in the first support groove of the lower bracket, and a second semi-circular bush seated in the second support groove of the upper bracket.

The first and second bushes may have anti-decoupling ends protruding from outer surfaces of respective tips thereof so that the anti-decoupling ends are inserted and locked into the first common locking groove of the lower bracket and the second common locking groove of the upper bracket.

The first and second bushes may have restraint grooves formed on inner surfaces of respective tips thereof so that the anti-decoupling flange formed at the end of the first or second shaft is inserted and locked into the restraint grooves.

The lower and upper brackets may be hinged at front ends thereof to each other by means of a hinge pin, and the lower and upper brackets may have bolt fastening holes formed at rear ends thereof.

The bush may be provided as a circular bush press-fitted to the first or second shaft, and a separate decoupling and clearance prevention pin, inserted and locked into the first and second common locking grooves, may be further press-fitted to the circular bush.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

BRIEF DESCRIPTION OF THE FIGURES

The above and other features of the present disclosure will now be described in detail with reference to certain exemplary embodiments thereof illustrated the accompanying drawings which are given hereinbelow by way of illustration only, and thus are not limitative of the present disclosure, and wherein.

Figure 1:
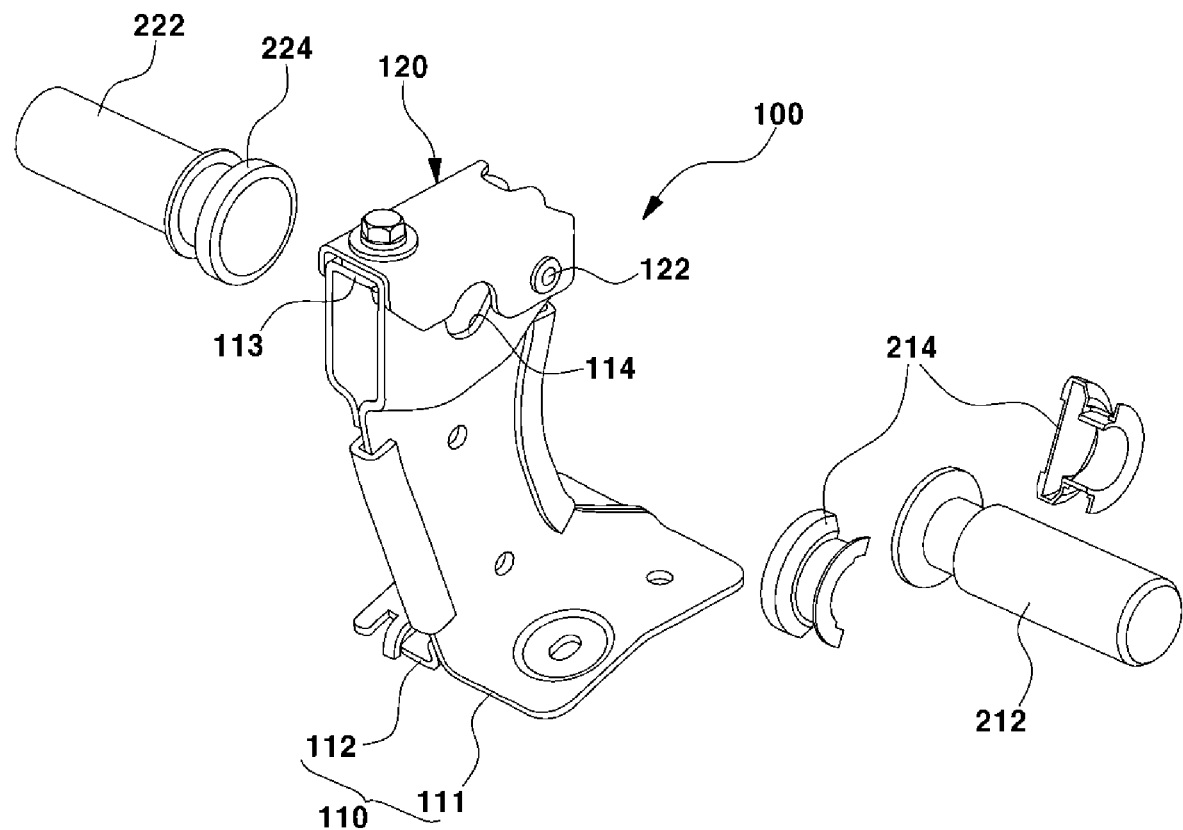
FIGS. 1, 2, and 3 are perspective views illustrating a conventional center hinge assembly and an assembly structure thereof.
Figure 2:
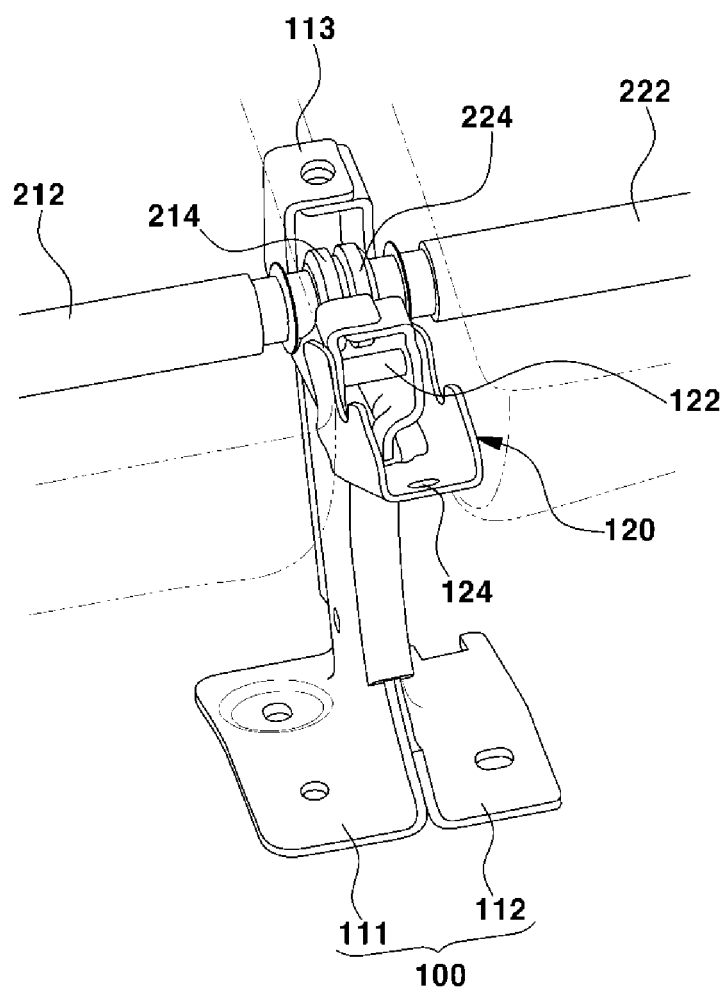
Figure 3:
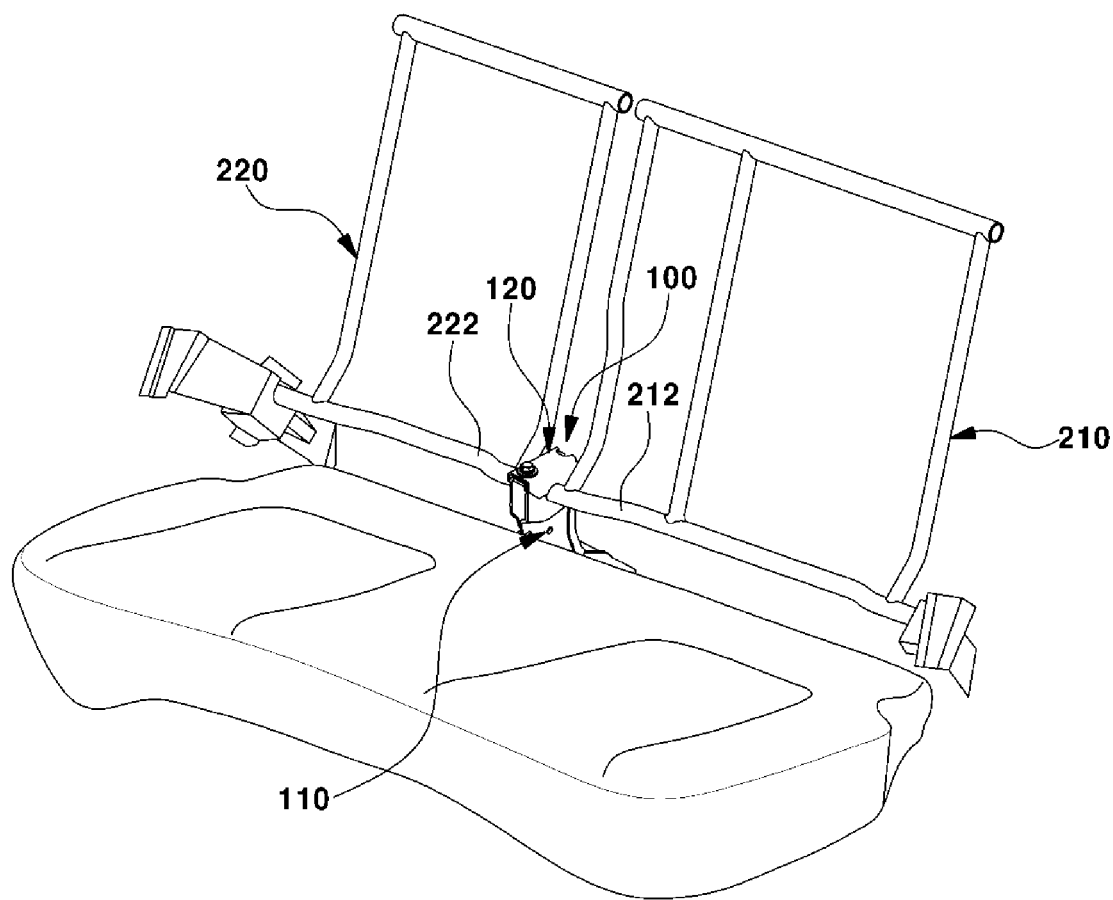
Figure 4:
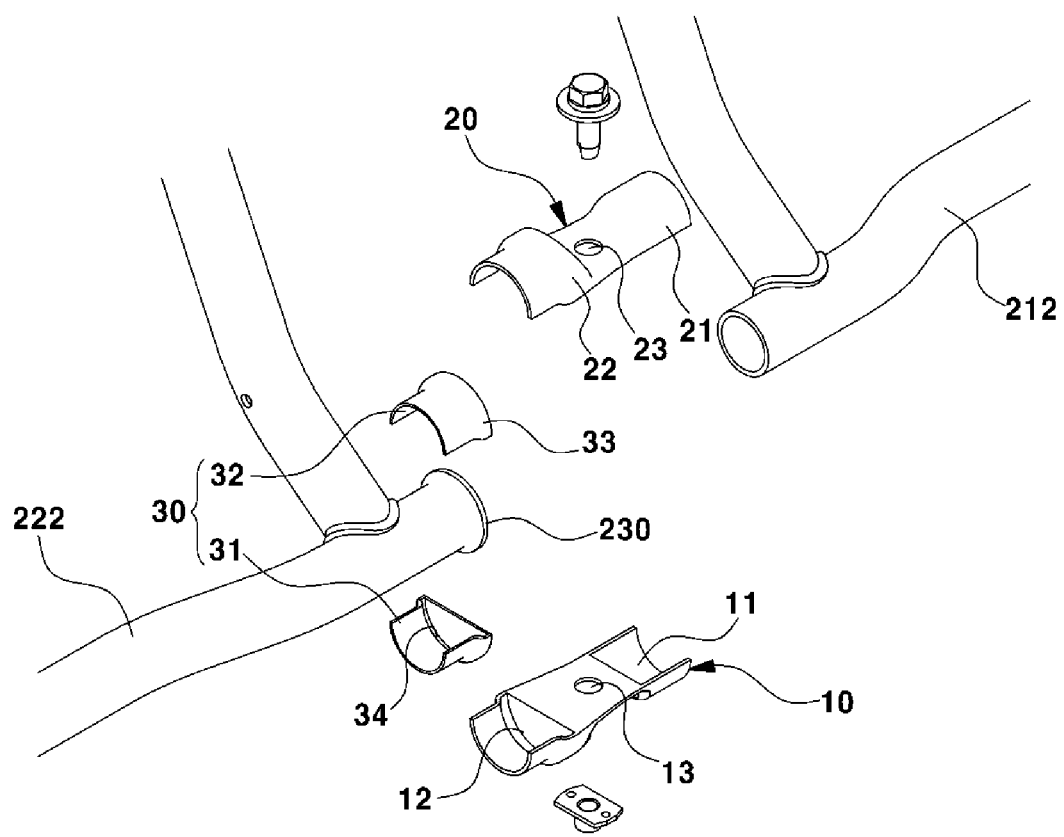
FIG. 4 is an exploded perspective view illustrating a center hinge assembly for a vehicle rear seat according to an embodiment of the present disclosure.

It should be understood that the appended drawings are not necessarily to scale, presenting a somewhat simplified representation of various preferred features illustrative of the basic principles of the disclosure. The specific design features of the present disclosure as disclosed herein, including, for example, specific dimensions, orientations, locations, and shapes will be determined in part by the particular intended application and use environment.

In the figures, reference numbers refer to the same or equivalent parts of the present disclosure throughout the several figures of the drawing.

DETAILED DESCRIPTION

Hereinafter reference will now be made in detail to various embodiments of the present disclosure, examples of which are illustrated in the accompanying drawings and described below. While the disclosure will be described in conjunction with exemplary embodiments, it will be understood that present description is not intended to limit the disclosure to those exemplary embodiments. On the contrary, the disclosure is intended to cover not only the exemplary embodiments, but also various alternatives, modifications, equivalents and other embodiments, which may be included within the spirit and scope of the disclosure as defined by the appended claims.

FIGS. 4 to 7 illustrate a center hinge assembly for a vehicle rear seat according to an embodiment of the present disclosure and an assembly state thereof, wherein reference numeral 212 designates a first shaft and reference numeral 222 designates a second shaft.

The first shaft 212 extends from the lower end of a left seat frame 210 forming a frame of a left rear seat, and the second shaft 222 extends from a right seat frame 220 forming a frame of a right rear seat.

The center hinge assembly according to the embodiment of the present disclosure includes a lower bracket 10 and an upper bracket 20 that rotatably connect the first shaft 212 and the second shaft 222, the lower and upper brackets 10 and 20 is manufactured in the same shape.

The lower bracket 10 has a first seating groove 11, which is formed at one end thereof so that the first shaft 212 of the left seat frame or the second shaft 222 of the right seat frame is inserted into the first seating groove 11, and a first locking groove 12 which is formed at the other end thereof, deeper than the first seating groove 11 so that a bush 30 fastened to the first or second shaft 212 or 222 is inserted and locked into the first locking groove 12.

The upper bracket 20 has a second seating groove 21, which is formed at one end thereof so that the first shaft 212 of the left seat frame or the second shaft 222 of the right seat frame is inserted into the second seating groove 21, and a second locking groove 22 formed, at the other end thereof, deeper than the second seating groove 21 so that the bush 30 fastened to the first or second shaft 212 or 222 is inserted and locked into the second locking groove 22.

In this case, the first seating groove 11 of the lower bracket 10 and the second seating groove 21 of the upper bracket 20 are each formed as a semi-circular groove, and form a circular groove while surrounding the first or second shaft 212 or 222 when the lower and upper brackets 10 and 20 are closely coupled to each other.

In addition, the first locking groove 12 of the lower bracket 10 and the second locking groove 22 of the upper bracket 20 are each formed as a semi-circular groove, and form a circular groove while surrounding the bush 30 when the lower and upper brackets 10 and 20 are closely coupled to each other.

The bush 30 includes a first semi-circular bush 31, which is inserted and locked into the first locking groove 12 of the lower bracket 10, and a second semi-circular bush 32 which is inserted and locked into the second locking groove 22 of the upper bracket 20, so as to surround the first shaft 212 or the second shaft 222.

In this case, the first and second bushes 31 and 32 have anti-decoupling ends 33 protruding from the outer surfaces of respective tips thereof so that the anti-decoupling ends 33 are inserted and locked into the first locking groove 12 of the lower bracket 10 and the second locking groove 22 of the upper bracket 20.

In addition, the first and second bushes 31 and 32 have restraint grooves 34 formed on the inner surfaces of respective tips thereof so that an anti-decoupling flange 230 formed at the end of the first or second shaft 212 or 222 is inserted and locked into the restraint grooves 34.

Meanwhile, a first bolt fastening hole 13 is formed between the one end and the other end of the lower bracket 10, and a second bolt fastening hole 23 is formed between the one end and the other end of the upper bracket 20.

Figure 5:
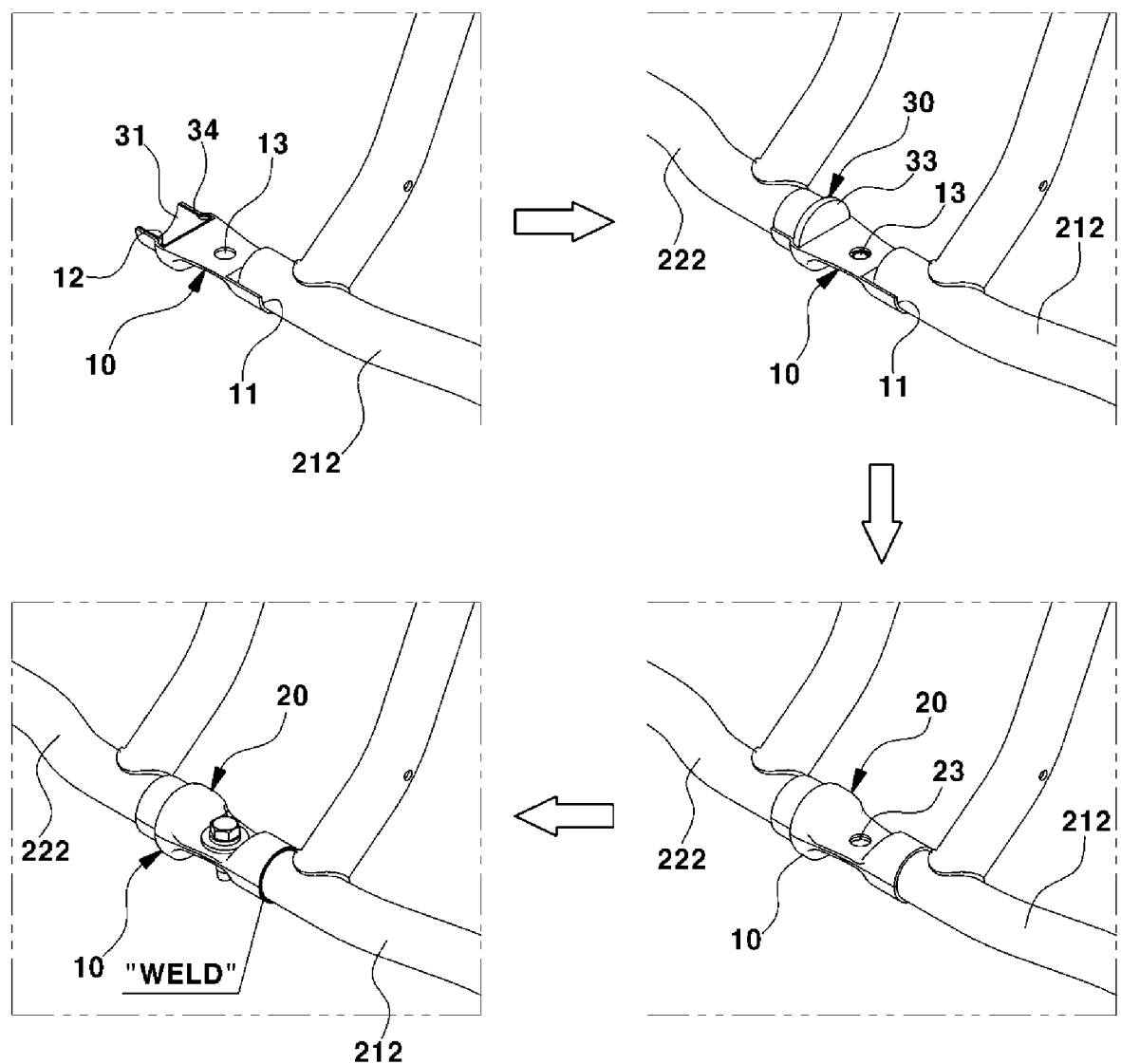
FIG. 5 is a perspective view sequentially illustrating a process of assembling the center hinge assembly for a vehicle rear seat according to the embodiment of the present disclosure.

Hereinafter, the process of assembling the center hinge assembly according to the embodiment of the present disclosure will be described with reference to FIG. 5.

First, after the first shaft 212 is seated in the first seating groove 11 of the lower bracket 10, the first bush 31 is then inserted and locked into the first locking groove 12 of the lower bracket 10.

Substantially, the anti-decoupling end 33 of the first bush 31 is inserted and locked into the first locking groove 12 of the lower bracket 10.

Subsequently, after the anti-decoupling flange 230 formed at the end of the second shaft 222 is inserted and locked into the restraint groove 34 of the first bush 31, the second bush 32 is seated on the second shaft 222.

In this case, the anti-decoupling flange 230 formed at the end of the second shaft 222 is inserted and locked into the restraint groove 34 of the second bush 32.

Next, the upper bracket 20 is seated on the first shaft 212 and the second bush 30.

In this case, the lower and upper brackets 10 and 20 are in close contact with each other.

In addition, the first shaft 212 is positioned in the second seating groove 21 of the upper bracket 20 while the anti-decoupling end 33 of the second bush 32 is kept inserted and locked into in the second locking groove 22 of the upper bracket 20.

Then, the assembly between the lower bracket 10 and the upper bracket 20 is completed by fasting a bolt to the first bolt fastening hole 13 of the lower bracket 10 and the second bolt fastening hole 23 of the upper bracket 20.

Finally, the one ends of the lower and upper brackets 10 and 20 are welded to the first shaft 212, thereby preventing the decoupling of the first shaft 212 while the first shaft 212 is rotatable together with the lower and upper brackets 10 and 20.

Figure 6:
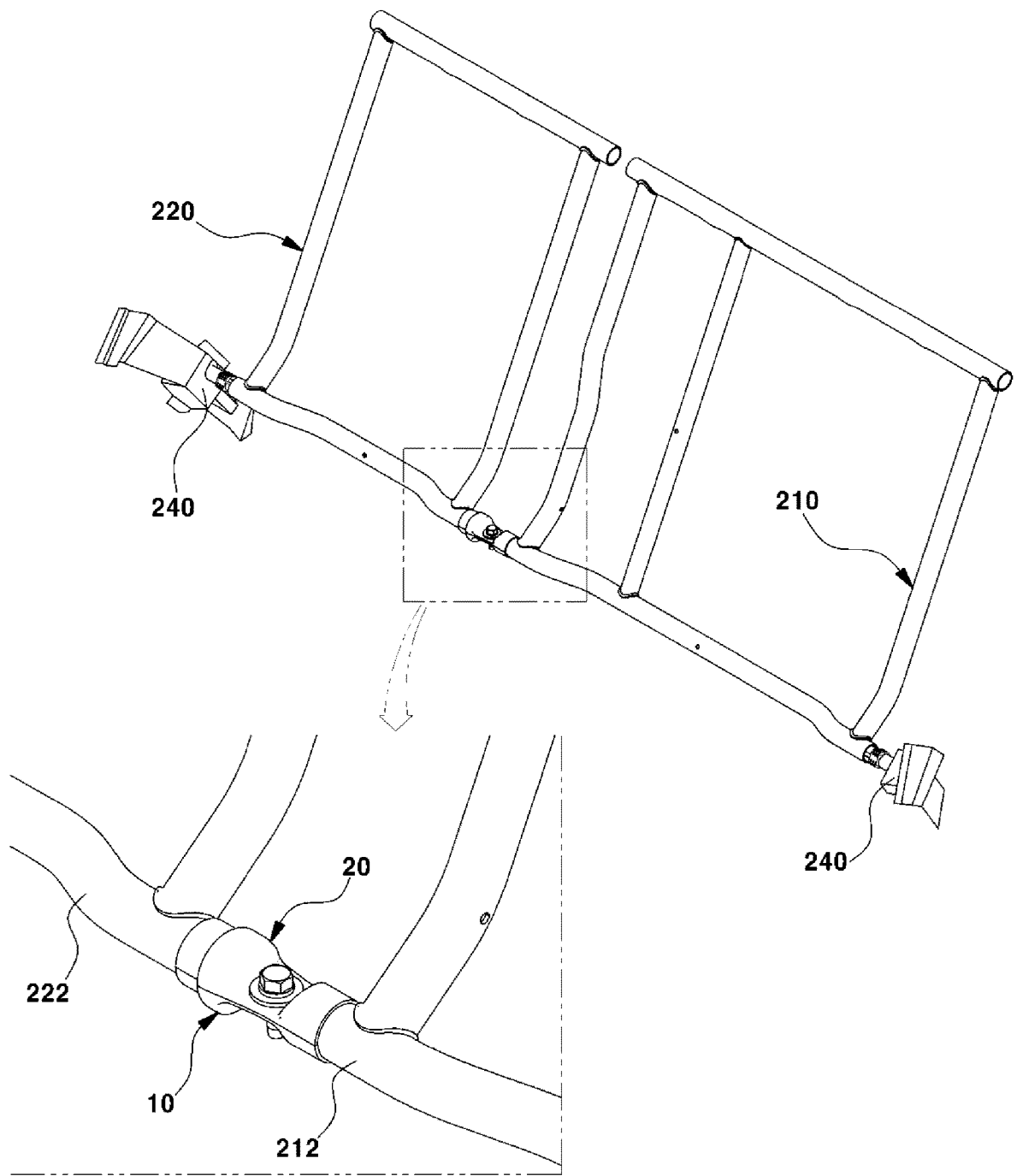
FIGS. 6 and 7 are perspective views illustrating completion of assembly between a rear seat frame and the center hinge assembly according to the embodiment of the present disclosure.
Figure 7:
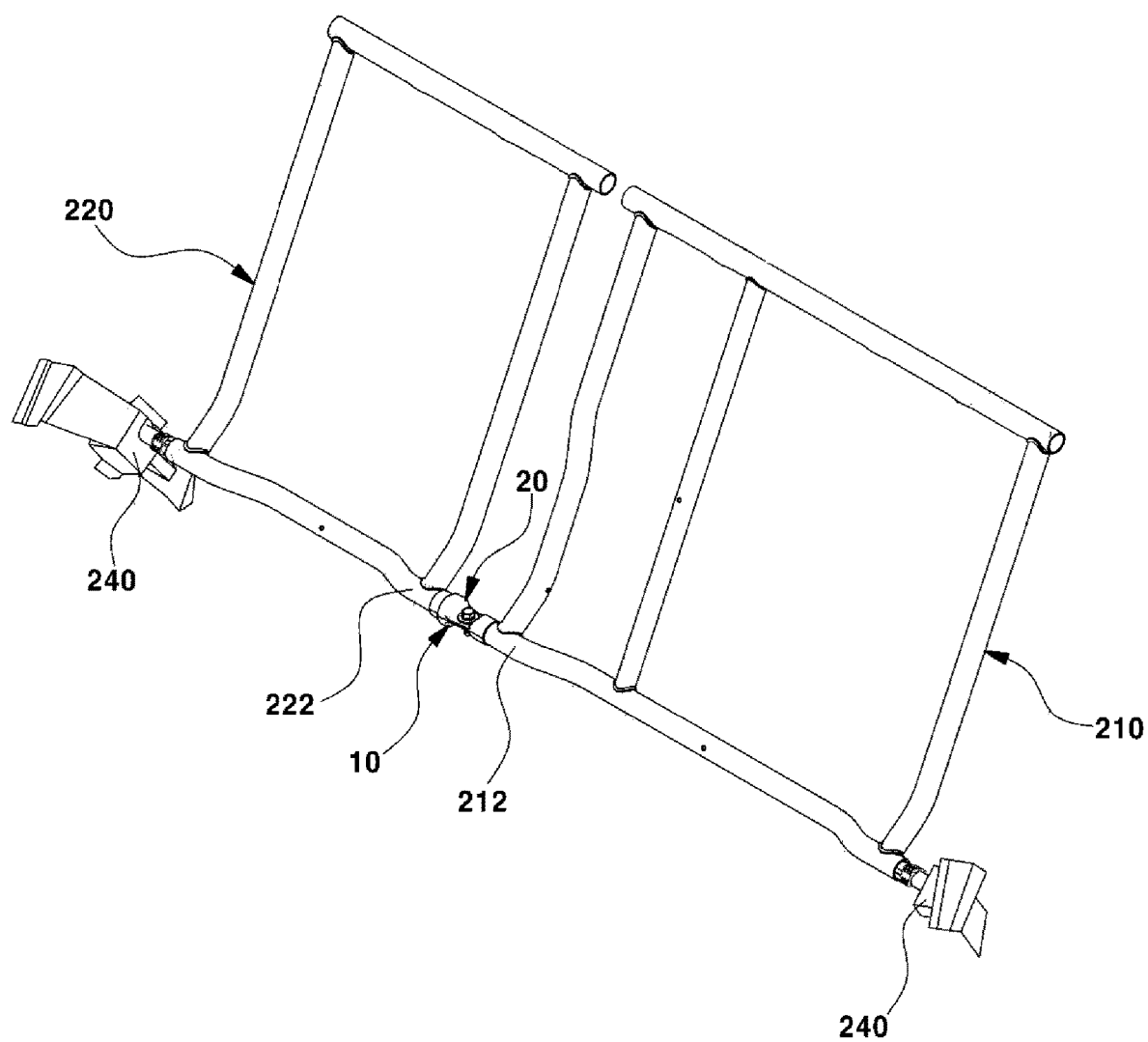

With reference to FIGS. 6 and 7 illustrating that the assembly between the left and right seat frames and the center hinge assembly is completed, since the outer ends of the first and second shafts 212 and 222 are rotatably connected to fixing brackets 240 fixed to a vehicle body, the left and right seat frames 210 and 220 are foldable.

Figure 8A:
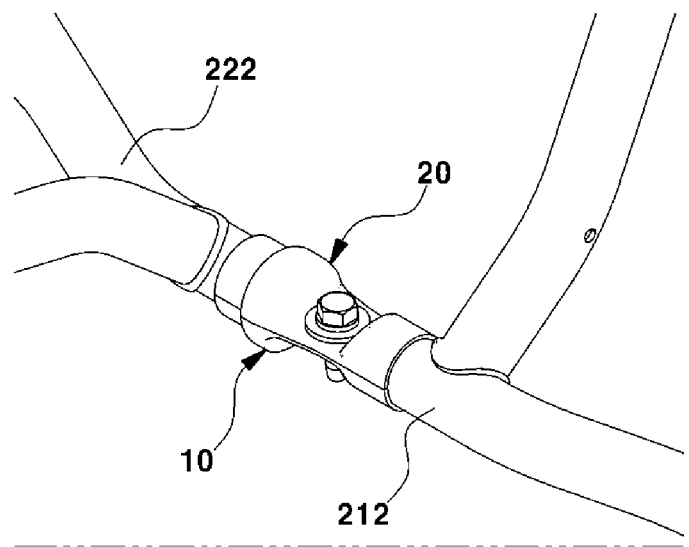
FIGS. 8A and 8B are views illustrating a folding operation of left and right seat frames connected to the center hinge assembly according to the embodiment of the present disclosure.
Figure 8B:
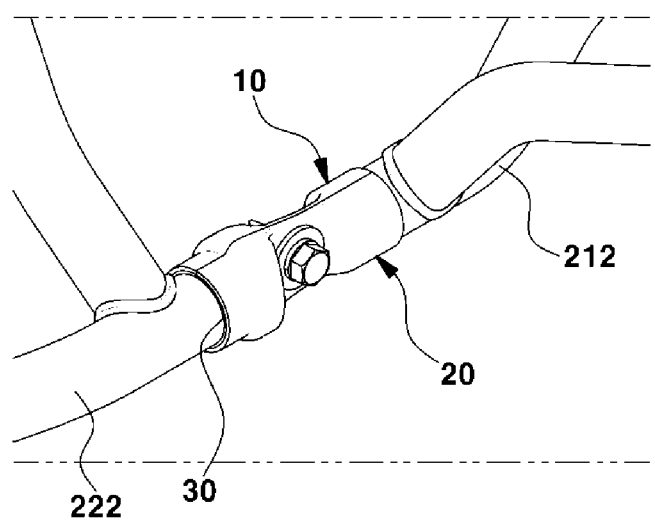

FIGS. 8A and 8B are views illustrating the folding operation of the left and right seat frames connected to the center hinge assembly according to the embodiment of the present disclosure.

As illustrated in FIG. 8A, the left seat frame 210 is folded by rotating the lower and upper brackets 10 and 20 together with the bush 30 fixed.

In more detail, the lower and upper brackets 10 and 20 are bolted to each other and welded to the first shaft 212 of the left seat frame 210. Therefore, when the lower and upper brackets 10 and 20 as well as the first shaft 212 are rotated forward about the anti-decoupling ends 33 of the bush 30, only the left seat frame 210 is folded forward.

On the other hand, as illustrated in FIG. 8B, the right seat frame 220 is folded by rotating the bush 30 together with the lower and upper brackets 10 and 20 fixed.

In more detail, the anti-decoupling flange 230 formed at the second shaft 222 of the right seat frame 220 is inserted and locked into the restraint grooves 34 of the bush 30 and the anti-decoupling ends 33 of the bush 30 are inserted and locked into the first locking groove 12 of the lower bracket 10 and the second locking groove 22 of the upper bracket 20. Therefore, when the second shaft 222 and the bush 30 are rotated forward, only the right seat frame 220 is folded forward.

As described above, in accordance with the embodiment of the present disclosure, it is possible to significantly reduce the number of parts of the center hinge assembly that connects the left and right seat frames of the rear seat, compared to the existing center hinge assembly, and thus to significantly reduce the man-hours of work. In addition, it is possible to easily guide the folding of the left and right seat frames.

Hereinafter, a center hinge assembly according to another embodiment of the present disclosure will be described as follows.

Figure 9:
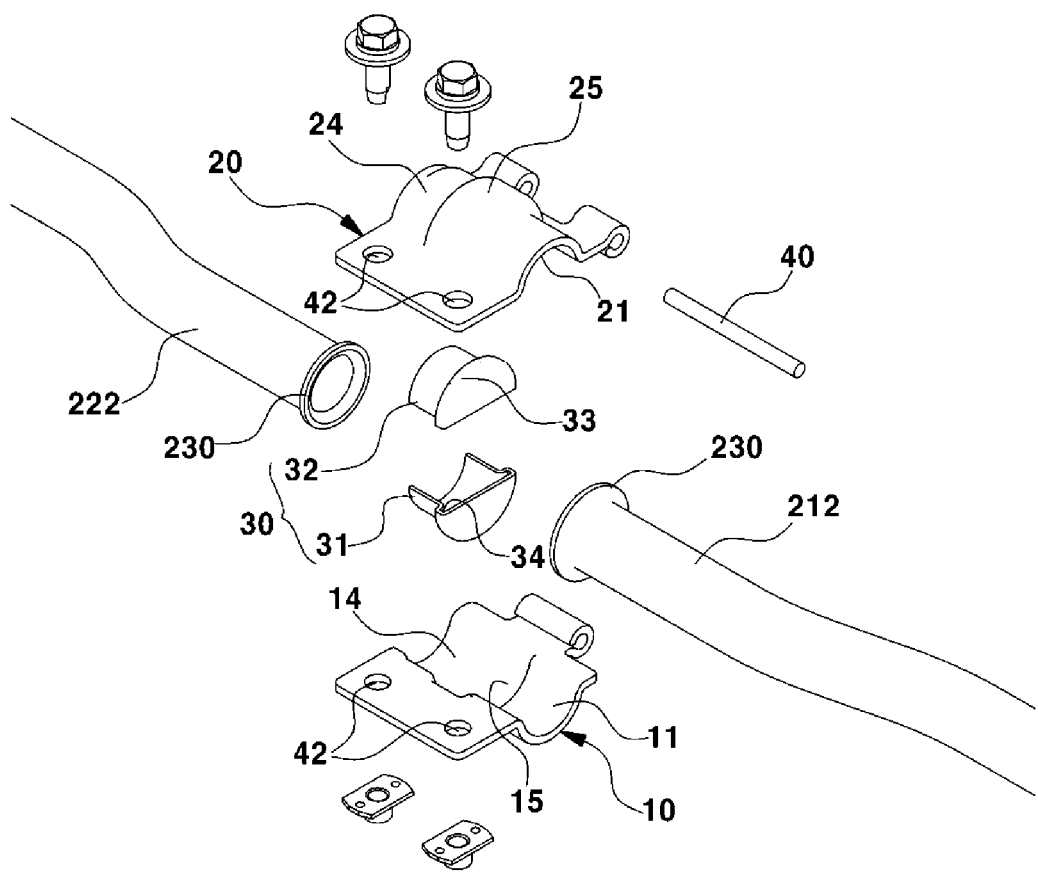
FIG. 9 is an exploded perspective view illustrating a center hinge assembly for a vehicle rear seat according to another embodiment of the present disclosure.
Figure 10:
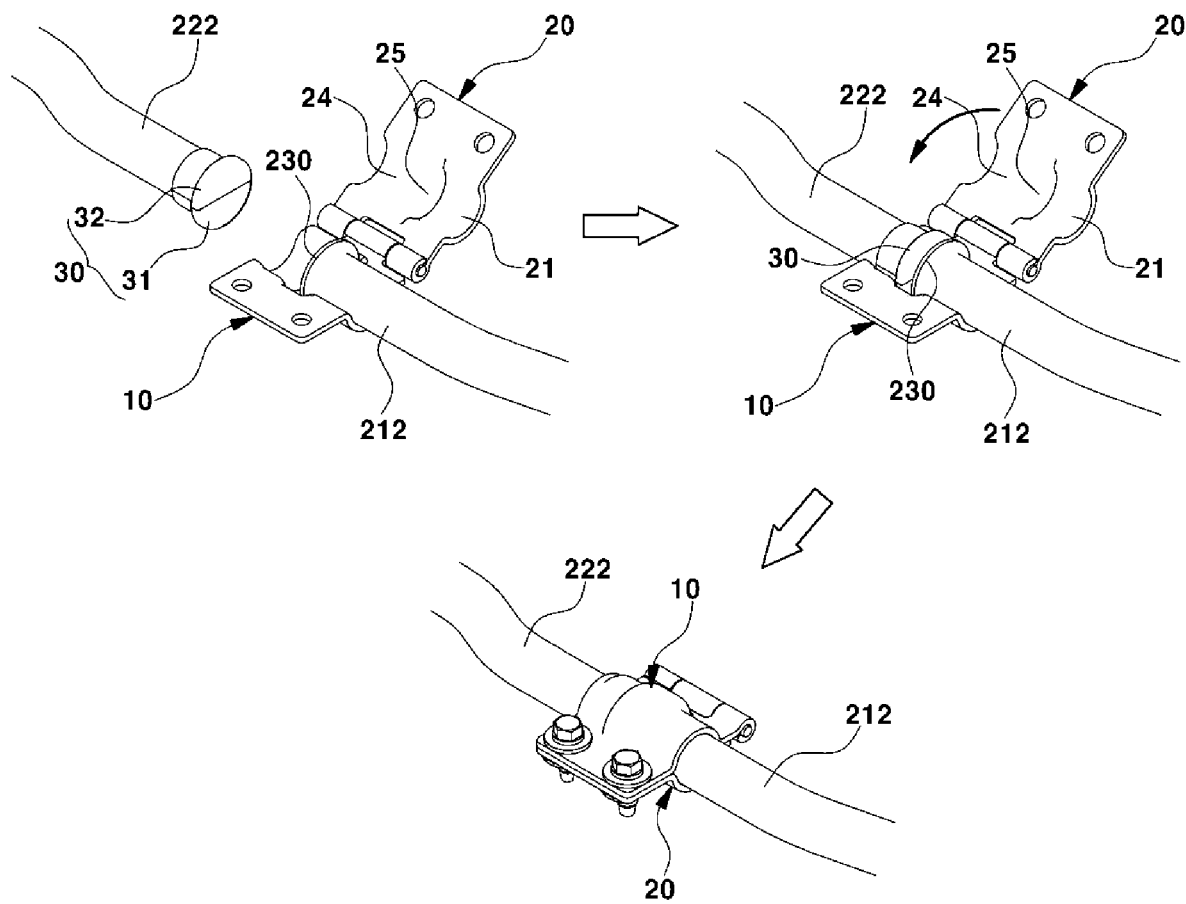
FIG. 10 is a perspective view sequentially illustrating a process of assembling the center hinge assembly for a vehicle rear seat according to another embodiment of the present disclosure.
Figure 11:
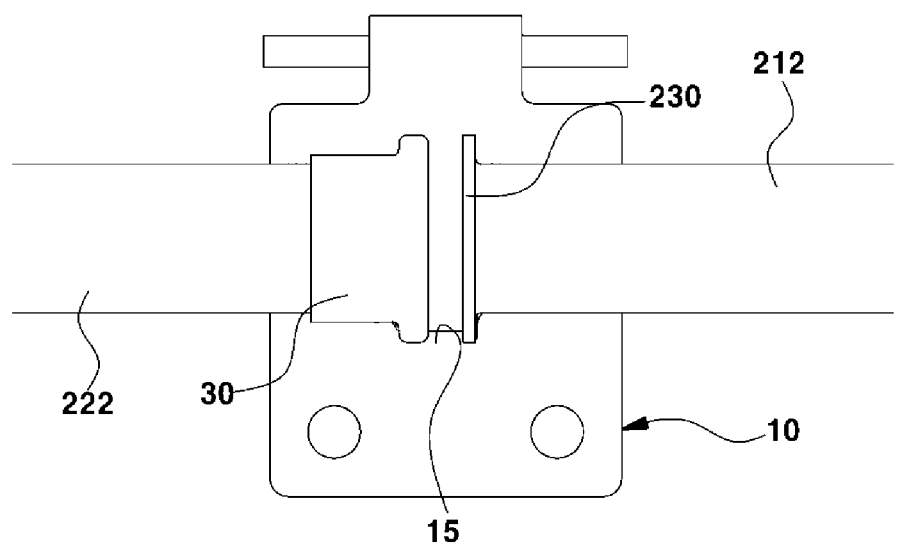
FIG. 11 is a perspective view illustrating completion of assembly between a rear seat frame and the center hinge assembly according to another embodiment of the present disclosure.

FIGS. 9 to 11 illustrate a center hinge assembly for a vehicle rear seat according to another embodiment of the present disclosure and an assembly structure thereof.

The center hinge assembly according to the embodiment of the present disclosure includes a lower bracket 10 and an upper bracket 20 that rotatably connect the first shaft 212 and the second shaft 222, the lower and upper brackets 10 and 20 is manufactured in the same shape.

The lower bracket 10 has a first seating groove 11, which is formed at one end thereof so that the first shaft 212 of the left seat frame 210 or the second shaft 222 of the right seat frame 220 is inserted into the first seating groove 11, a first support groove 14, which is formed at the other end thereof so that a bush 30 fastened to the first or second shaft 212 or 222 is seated in the first support groove 14, and a first common locking groove 15 which is formed between the one end and the other end thereof, deeper than the first seating groove 11 and the first support groove 14 so that an anti-decoupling flange 230 of the first or second shaft 212 or 222 is inserted and locked into the first common locking groove 15 while the bush 30 is inserted and locked into the first common locking groove 15.

The upper bracket 20 has a second seating groove 21, which is formed at one end thereof so that the first shaft 212 of the left seat frame 210 or the second shaft 222 of the right seat frame 220 is inserted into the second seating groove 21, a second support groove 24, which is formed at the other end thereof so that the bush 30 fastened to the first or second shaft 212 or 222 is seated in the second support groove 24, and a second common locking groove 25 which is formed between the one end and the other end thereof, deeper than the second seating groove 21 and the second support groove 24 so that the anti-decoupling flange 230 of the first or second shaft 212 or 222 is inserted and locked into the second common locking groove 25 while the bush 30 is inserted and locked into the second common locking groove 25.

The first and second seating grooves 11 and 21 are each formed as a semi-circular groove, and form a circular groove while surrounding the first or second shaft 212 or 222 when the lower and upper brackets 10 and 20 are closely coupled to each other.

Likewise, the first and second support grooves 14 and 24 are each formed as a semi-circular groove, and form a circular groove while surrounding the bush 30 when the lower and upper brackets 10 and 20 are closely coupled to each other.

In addition, the first and second common locking grooves 15 and 25 are each formed a semi-circular groove, and form a circular groove while locking the first or second shaft 212 or 222 and the bush 30 when the lower and upper brackets 10 and 20 are closely coupled to each other.

As in the above-mentioned embodiment, the bush 30 includes a first semi-circular bush 31, which is seated in the first support groove 14 of the lower bracket 10, and a second semi-circular bush 32 which is seated in the second support groove 24 of the upper bracket 20.

In addition, the first and second bushes 31 and 32 have anti-decoupling ends 33 protruding from the outer surfaces of respective tips thereof so that the anti-decoupling ends 33 are inserted and locked into the first common locking groove 15 of the lower bracket 10 and the second common locking groove 25 of the upper bracket 20.

In addition, the first and second bushes 31 and 32 have restraint grooves 34 formed on the inner surfaces of respective tips thereof so that the anti-decoupling flange 230 formed at the end of the first or second shaft 212 or 222 is inserted and locked into the restraint grooves 34.

Meanwhile, the front ends of the lower and upper brackets 10 and 20 are hinged to each other by means of a hinge pin 40, and the rear ends of the lower and upper brackets 10 and 20 are formed with bolt fastening holes 42.

Hereinafter, the process of assembling the center hinge assembly according to the embodiment of the present disclosure will be described with reference to FIG. 10.

First, the first and second bushes 31 and 32 of the bush 30 surround and are fastened to the second shaft 222.

Subsequently, the anti-decoupling flange 230 of the first shaft 222 is inserted and locked into the first common locking groove 15 of the lower bracket 10 while the anti-decoupling end 33 of the bush 30 is inserted and locked into the first common locking groove 15 of the lower bracket 10.

Next, when the upper bracket 20 is rotated about the hinge pin 40 to cover the lower bracket 10, the anti-decoupling flange 230 and the anti-decoupling end 33 are inserted and locked into the second common locking groove 25 of the upper bracket 20.

Then, the assembly of the center hinge assembly according to another embodiment of the present disclosure is completed by fasting a bolt to the bolt fastening holes 42 formed in the rear ends of the lower and upper brackets 10 and 20. FIG. 11 shows the completed assembly.

Thus, since the anti-decoupling flange 230 of the first shaft 212 is easily rotated in the first and second common locking grooves 15 and 25, the left seat frame 210 can be easily folded.

On the other hand, since the anti-decoupling ends 33 of the bush 30 fastened to the second shaft 222 are easily rotated in the first and second common locking grooves 15 and 25, the right seat frame 220 can be easily folded.

As described above, in accordance with another embodiment of the present disclosure, it is possible to significantly reduce the number of parts of the center hinge assembly that connects the left and right seat frames of the rear seat, compared to the existing center hinge assembly, and thus to significantly reduce the man-hours of work. In addition, it is possible to easily guide the folding of the left and right seat frames.

Figure 12:
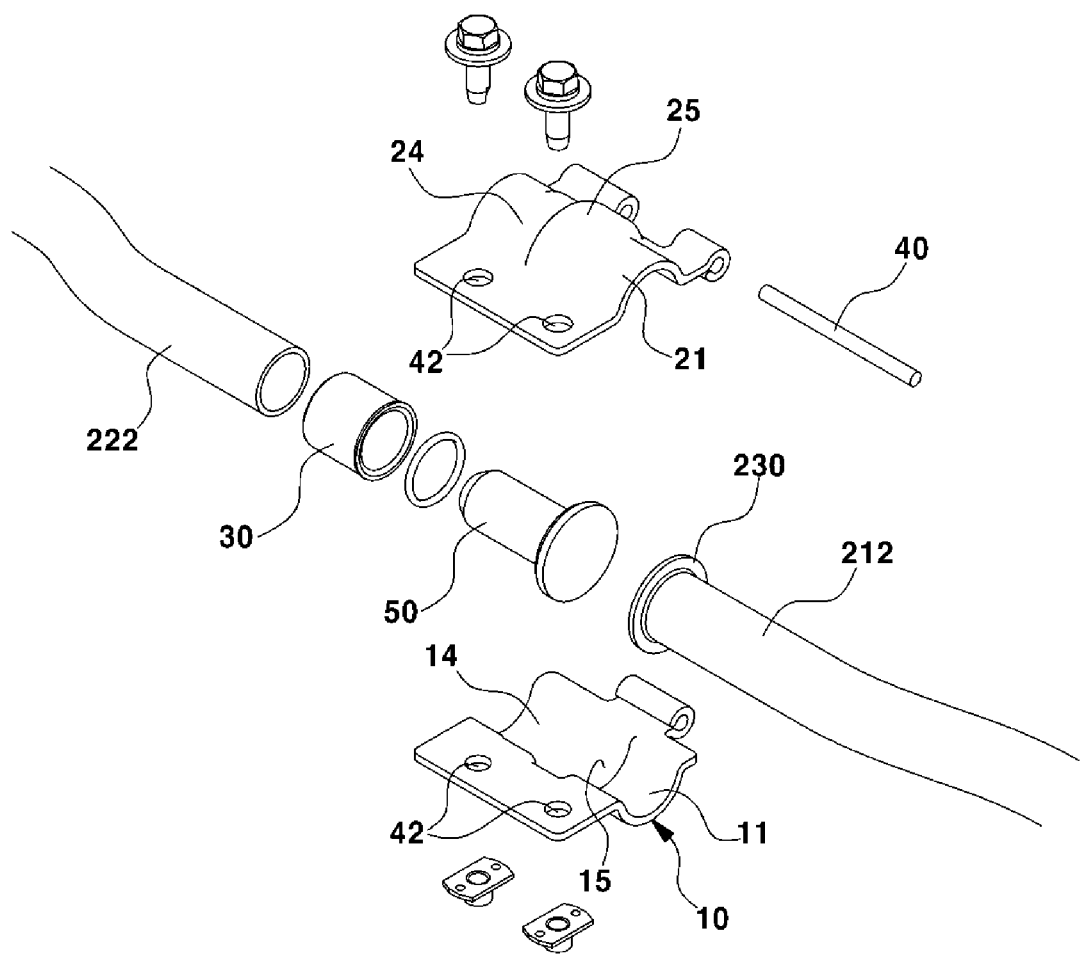
FIG. 12 is an exploded perspective view illustrating a center hinge assembly for a vehicle rear seat according to a further embodiment of the present disclosure.
Figure 13:
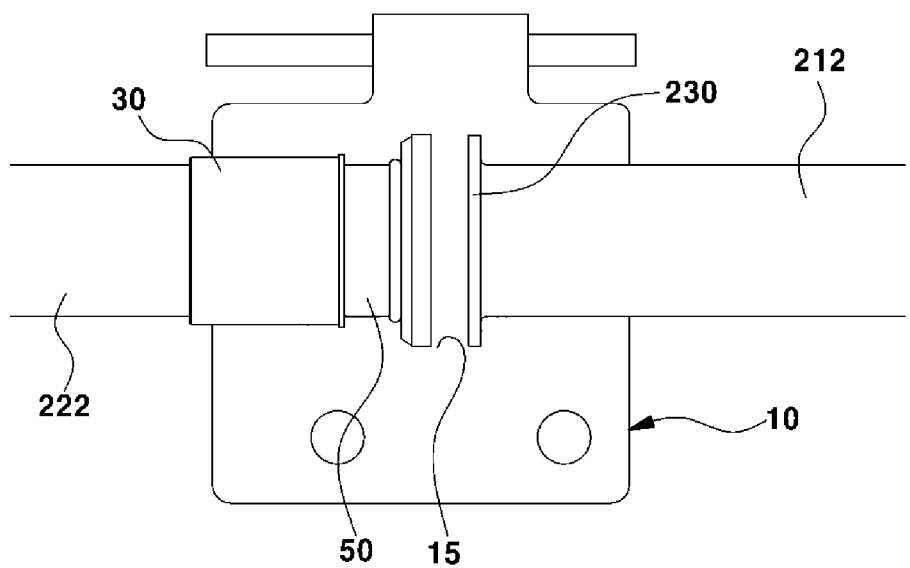
FIG. 13 is a perspective view illustrating completion of assembly between a rear seat frame and the center hinge assembly according to the further embodiment of the present disclosure.

FIGS. 12 and 13 illustrate a center hinge assembly for a vehicle rear seat according to a further embodiment of the present disclosure.

The further embodiment of the present disclosure is characterized in that the configuration and operation thereof are the same as those of the above embodiments, only a bush has a different structure, and a decoupling and clearance prevention pin is further added.

As illustrated in FIGS. 12 and 13, the center hinge assembly includes a circular bush 30 that is press-fitted to the first or second shaft 212 or 222 and a decoupling and clearance prevention pin 50 is further press-fitted to the circular bush.

In this case, the head of the decoupling and clearance prevention pin 50 is inserted and locked into the first common locking groove 15 of the lower bracket 10 and the second common locking groove 25 of the upper bracket 20.

As such, it is possible to reinforce the stiffness of the bush 30 by means of the decoupling and clearance prevention pin 50.

In accordance with the exemplary embodiments, the present disclosure provides the following effects.

First, it is possible to significantly reduce the number of parts of the center hinge assembly that connects the left and right seat frames of the rear seat, compared to the existing center hinge assembly, and thus to significantly reduce the man-hours of work.

Second, since the center hinge assembly of the present disclosure is significantly reduced in size and volume, compared to the existing center hinge assembly, thereby simplifying the assembly structure. Therefore, it is possible to achieve a reduction in weight and an improvement in assembly workability.

The disclosure has been described in detail with reference to preferred embodiments thereof. However, it will be appreciated by those skilled in the art that changes may be made in these embodiments without departing from the principles and spirit of the disclosure, the scope of which is defined in the appended claims and their equivalents.

The invention claimed is:

1. A center hinge assembly for a vehicle rear seat, comprising:
    a lower bracket having a first seating groove formed at one end thereof so that a first shaft of a left seat frame or a second shaft of a right seat frame is inserted into the first seating groove, and a first locking groove formed at the other end thereof, deeper than the first seating groove, so that a bush fastened to the first or second shaft is inserted and locked into the first locking groove; and
    an upper bracket having a second seating groove formed at one end thereof so that the first shaft of the left seat frame or the second shaft of the right seat frame is inserted into the second seating groove, and a second locking groove formed at the other end thereof, deeper than the second seating groove, so that the bush fastened to the first or second shaft is inserted and locked into the second locking groove, wherein the one end of the lower bracket and the one end of the upper bracket are fixed to the first or second shaft by welding.

2. The center hinge assembly of claim 1, wherein the first and second seating grooves are each formed as a semi-circular groove, and form a circular groove while surrounding the first or second shaft when the lower and upper brackets are closely coupled to each other.

3. The center hinge assembly of claim 1, wherein the first and second locking grooves are each formed as a semi-circular groove, and form a circular groove while surrounding the bush when the lower and upper brackets are closely coupled to each other.

4. The center hinge assembly of claim 1, wherein the bush includes a first semi-circular bush, inserted and locked into the first locking groove of the lower bracket, and a second semi-circular bush inserted and locked into the second locking groove of the upper bracket.

5. The center hinge assembly of claim 4, wherein the first and second bushes have anti-decoupling ends protruding from outer surfaces of respective tips thereof so that the anti-decoupling ends are inserted and locked into the first locking groove of the lower bracket and the second locking groove of the upper bracket.

6. The center hinge assembly of claim 1, wherein a first bolt fastening hole is formed between the one end and the other end of the lower bracket, and a second bolt fastening hole is formed between the one end and the other end of the upper bracket.

7. A center hinge assembly for a vehicle rear seat, comprising:
    a lower bracket having a first seating groove formed at one end thereof so that a first shaft of a left seat frame or a second shaft of a right seat frame is inserted into the first seating groove, and a first locking groove formed at the other end thereof, deeper than the first seating groove, so that a bush fastened to the first or second shaft is inserted and locked into the first locking groove; and
    an upper bracket having a second seating groove formed at one end thereof so that the first shaft of the left seat frame or the second shaft of the right seat frame is inserted into the second seating groove, and a second locking groove formed at the other end thereof, deeper than the second seating groove, so that the bush fastened to the first or second shaft is inserted and locked into the second locking groove, wherein the bush includes a first semi-circular bush inserted and locked into the first locking groove of the lower bracket, and a second semi-circular bush inserted and locked into the second locking groove of the upper bracket, wherein the first and second bushes have restraint grooves formed on inner surfaces of respective tips thereof so that an anti-decoupling flange formed at the end of the first or second shaft is inserted and locked into the restraint grooves.

8. A center hinge assembly for a vehicle rear seat, comprising:
a lower bracket having a first seating groove formed at one end thereof so that a first shaft of a left seat frame or a second shaft of a right seat frame is inserted into the first seating groove, a first support groove formed at the other end thereof so that a bush fastened to the first or second shaft is seated in the first support groove, and a first common locking groove formed between the one end and the other end thereof, deeper than the first seating groove and the first support groove, so that an anti-decoupling flange of the first or second shaft is inserted and locked into the first common locking groove while the bush is inserted and locked into the first common locking groove; and
an upper bracket having a second seating groove formed at one end thereof so that the first shaft of the left seat frame or the second shaft of the right seat frame is inserted into the second seating groove, a second support groove formed at the other end thereof so that the bush fastened to the first or second shaft is seated in the second support groove, and a second common locking groove formed between the one end and the other end thereof, deeper than the second seating groove and the second support groove, so that the anti-decoupling flange of the first or second shaft is inserted and locked into the second common locking groove while the bush is inserted and locked into the second common locking groove.

9. The center hinge assembly of claim 8, wherein the first and second seating grooves are each formed as a semi-circular groove, and form a circular groove while surrounding the first or second shaft when the lower and upper brackets are closely coupled to each other.

10. The center hinge assembly of claim 8, wherein the first and second support grooves are each formed as a semi-circular groove, and form a circular groove while surrounding the bush when the lower and upper brackets are closely coupled to each other.

11. The center hinge assembly of claim 8, wherein the first and second common locking grooves are each formed a semi-circular groove, and form a circular groove while locking the first or second shaft and the bush when the lower and upper brackets are closely coupled to each other.

12. The center hinge assembly of claim 8, wherein the bush includes a first semi-circular bush, seated in the first support groove of the lower bracket, and a second semi-circular bush seated in the second support groove of the upper bracket.

13. The center hinge assembly of claim 12, wherein the first and second bushes have anti-decoupling ends protruding from outer surfaces of respective tips thereof so that the anti-decoupling ends are inserted and locked into the first common locking groove of the lower bracket and the second common locking groove of the upper bracket.

14. The center hinge assembly of claim 12, wherein the first and second bushes have restraint grooves formed on inner surfaces of respective tips thereof so that the anti-decoupling flange formed at the end of the first or second shaft is inserted and locked into the restraint grooves.

15. The center hinge assembly of claim 8, wherein the lower and upper brackets are hinged at front ends thereof to each other by means of a hinge pin, and the lower and upper brackets have bolt fastening holes formed at rear ends thereof.

16. The center hinge assembly of claim 8, wherein the bush is provided as a circular bush press-fitted to the first or second shaft, and a separate decoupling and clearance prevention pin, inserted and locked into the first and second common locking grooves, is further press-fitted to the circular bush.

* * * * *